United States Patent [19]

Nelander

[11] Patent Number: 5,327,999
[45] Date of Patent: Jul. 12, 1994

[54] BRAKE LEVER FOR AN S-CAM AUTOMOTIVE DRUM BRAKE

[75] Inventor: Åke Nelander, Bunkeflostrand, Sweden

[73] Assignee: Haldex AB, Sweden

[21] Appl. No.: 153,918

[22] Filed: Nov. 17, 1993

[30] Foreign Application Priority Data

Nov. 18, 1992 [SE] Sweden .............................. 9203455-2

[51] Int. Cl.⁵ ............................................. F16D 65/52
[52] U.S. Cl. ........................... 188/79.55; 188/196 BA; 188/196 F
[58] Field of Search ......... 188/79.55, 196 BA, 196 R, 188/196 B, 196 D, 79.56, 79.51, 196 F, 329, 330, 332, 338, 339; 192/111 A

[56] References Cited

U.S. PATENT DOCUMENTS

| | | | |
|---|---|---|---|
| 3,526,303 | 9/1970 | Lodjic et al. | 188/79.55 |
| 4,071,120 | 1/1978 | Hagin | 188/79.55 |
| 4,484,665 | 11/1984 | Svensson | 188/79.55 |

Primary Examiner—Douglas C. Butler
Attorney, Agent, or Firm—Laurence R. Brown

[57] ABSTRACT

A brake lever for an S-cam brake has a worm wheel (3) engaging the S-cam shaft and a worm screw (4) meshing therewith. A clutch wheel (6) on the worm screw forms a clutch (8) therewith under the bias of a compression spring (9). A control movement is transmitted from an external reference point to the clutch wheel via a pinion (15), a carrier wheel (16) and a control screw (18), the common axis of these three parts being perpendicular to the worm screw, wherein the control screw meshes with the clutch wheel. The carrier wheel can be turned relative to the pinion an angular distance corresponding to the desired slack and is biassed to one end position by a torsion spring (17), which is also used to engage a one-way clutch (19) between the carrier wheel and the control screw.

2 Claims, 4 Drawing Sheets

BRAKE LEVER FOR AN S-CAM AUTOMOTIVE DRUM BRAKE

TECHNICAL FIELD

This invention relates to a brake lever for attachment to a splined S-cam shaft of an automotive drum brake and connection to a brake cylinder push rod.

The brake lever includes a worm wheel, rotatably mounted in a housing of the brake lever and having internal splines for cooperation with the S-cam shaft, a worm screw, rotatable in the housing perpendicularly to the worm wheel and meshing therewith, and a control arrangement for transmitting a control movement from a reference point to a clutch wheel, which is rotatable on the worm screw, depending on the angular movement of the brake lever, and which forms a clutch with the worm screw normally held engaged by a strong compression spring.

This control arrangement includes a control disc, which is rotatable coaxially with the worm wheel and is connected to a control ring having a control arm for establishing the reference point by being attached to a fixed part of a vehicle chassis, a pinion meshing with the toothed periphery of the control disc, a carrier wheel and a control screw, the latter two parts being coaxial with the pinion and the last mentioned part being in tooth engagement with the clutch wheel, wherein the axis of the worm screw is perpendicular to the axis of the pinion, carrier wheel and control screw.

BACKGROUND ART

Especially for heavy road vehicles, such as trucks and buses, so called S-cam drum brakes are often used. Brake shoes provided with brake linings may be pressed apart against a brake drum by means of a generally S-shaped cam rotatable with a shaft (called the S-cam shaft) extending out of the brake drum. A lever, called the brake lever, attached to the S-cam shaft is connected to a piston rod of a preferably pneumatic brake cylinder in the vehicle underframe. Thus, at the admission of air under pressure to the brake cylinder a brake force will be transmitted from the piston rod via the brake lever to the S-cam shaft and the S-cam, which will press apart the brake shoes and thus apply the brakes.

When wear of the brake linings occurs, a longer stroke of the brake cylinder piston rod will be necessary before the brake is applied. It has become common to provide the brake lever with internal means for automatically turning a worm screw in engagement with a worm wheel, which is attached to the S-cam shaft, and thus adjusting the angular position of the brake lever in dependence on the brake lining wear; a so equipped lever is in the art called an automatic brake lever.

Most of the designs for such automatic brake levers are based on the so called piston stroke principle, i.e. the adjustment depends entirely on the piston rod stroke or in other words the angular movement of the brake lever past a certain value corresponding to the normal clearance or slack between the brake linings and the brake drum in the rest position.

More recently it has been found that different reasons speak for a more advanced principle—the so called clearance sensing principle. In this case the adjusting mechanism is able to differentiate between the piston rod stroke depending on the wear of the brake linings and that depending on the often considerable elasticity in the different parts between the brake cylinder and the brake drum. This means that the automatic adjustment reduces the clearance to the normal and desired value when it has become excessive, due for example to wear of the brake linings, whereas the mechanism ignores the influence of the elasticity.

Different requirements are imposed on a product of this kind. Generally speaking an automatic brake lever is a safety device working under extremely hard conditions as regards loads and environment. Further, the available space for the brake lever is often very limited. The reliability must be high and the periods between normal services as long as possible. Last but not least the price must be competitive.

Still further it is desirable to obviate the necessity for mounting the brake lever in a certain predetermined position, which is inconvenient not only at the initial mounting but even more after later servicing. The automatic brake lever shall thus preferably have a so called floating reference point or fixpoint.

The control arrangement for the brake lever ending with the clutch wheel on the worm screw shall have certain properties. Preferably the mechanism shall be slow-acting, which means that only a fraction of the whole excessive slack is to be reduced at each brake application. The control arrangement must therefore have a certain reduction, which may be obtained by a gearing between the control ring with its control arm and the clutch ring, namely in this case—coaxial with each other—the pinion, the carrier wheel and the control screw engaging the clutch ring perpendicular thereto.

Certain automatic brake levers with such a supplementary gearing are earlier known, such as U.S. Pat. No. 3 526 303, U.S. Pat. No. 4 484 665 and EP-A-30 766, which is regarded as the closest prior art.

A problem with a conventional brake lever of the kind where the necessary reference point for the slack adjusting function of the lever is found in a fix point in the vehicle chassis, is that the original mounting of the lever has to be done with certain accuracy in order to obtain the later proper function.

It is instead desirable to find a solution where the position of the reference point—and accordingly the angular position of the control arm relative to the lever housing—is immaterial for the proper function. The desirable condition can be called a floating reference point.

It is also desirable—in a slow-acting, clearance-sensing adjuster with a floating reference point—to have the adjustment performed during the return stroke, when the different parts are less strained than during the brake application stroke.

THE INVENTION

A brake lever of the kind described above having all the cited advantages and desirable characteristics is according to the invention attained in that the carrier wheel can be turned or has a lost motion relative to the pinion corresponding to a desired slack or control distance for the brake lever and is angularly biassed by a torsion spring in a direction corresponding to brake application and in that a toothed one-way clutch is formed between the carrier wheel and the control screw.

The torsion spring also acts as a compression spring for keeping the one-way clutch engaged.

BRIEF DESCRIPTION OF THE DRAWINGS

The invention will be described in further detail below, reference being made to the accompanying drawings, in which.

DESCRIPTION OF A PREFERRED EMBODIMENT

A brake lever of the general type concerned is well known in the art. It constitutes a connection lever in a brake system of a heavy road vehicle between a push rod of a brake cylinder and a splined S-cam shaft of a drum brake arrangement, comprising a brake drum and brake shoes to be pressed apart by an S-cam for braking engagement with the brake drum.

A brake lever housing 1 is at its upper end provided with a hole 2 for connection to the brake cylinder push rod. Towards its opposite end the brake lever is provided with a rotatable worm wheel 3, which has internal splines 3' for attachment to the S-cam shaft. Meshing with this worm wheel 3 is a worm screw 4, which is rotatably mounted crosswise in the housing 1.

Figure 3:
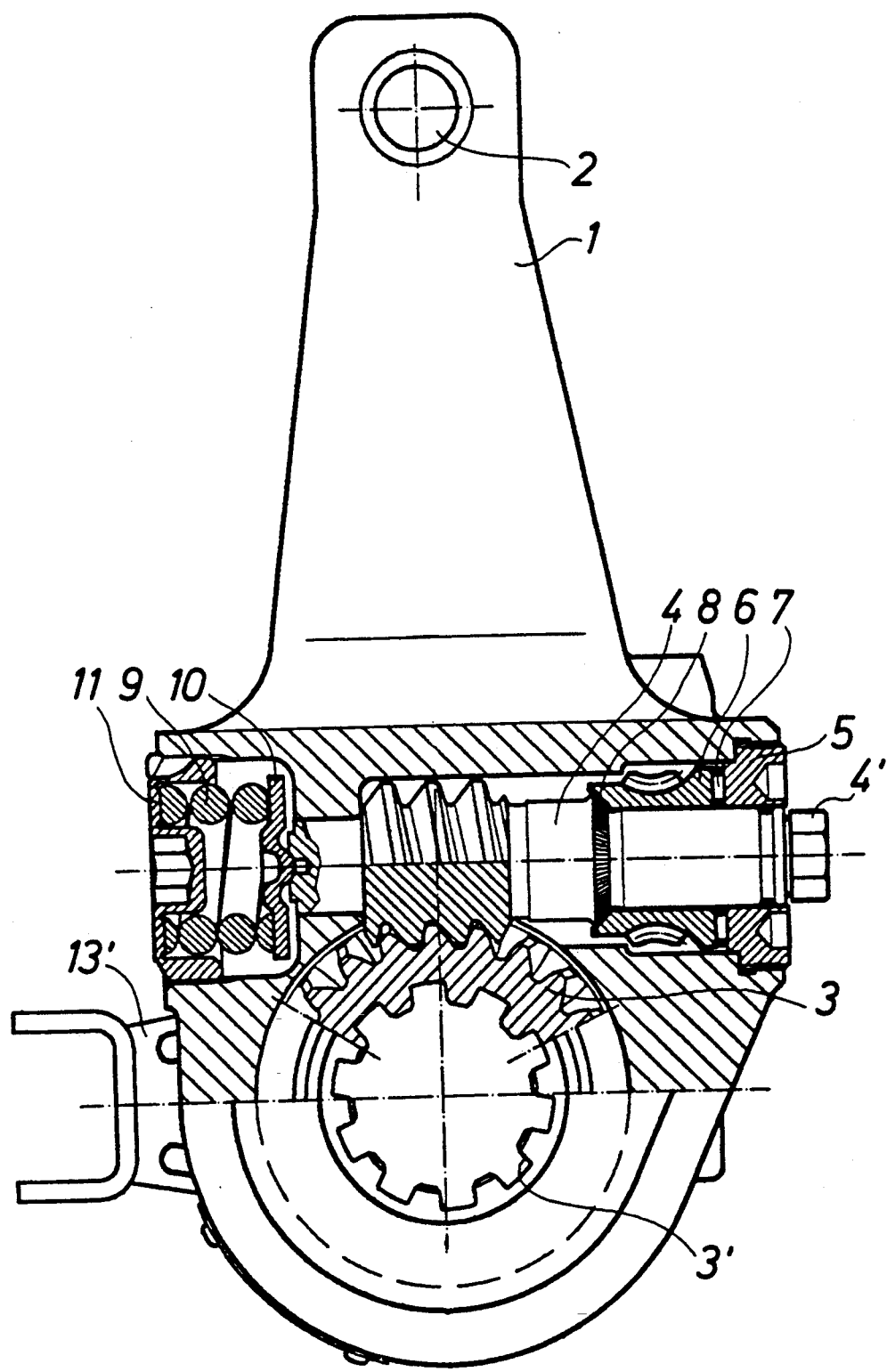
FIG. 3 is a view along the line III—III in FIG. 2.
Figure 4:
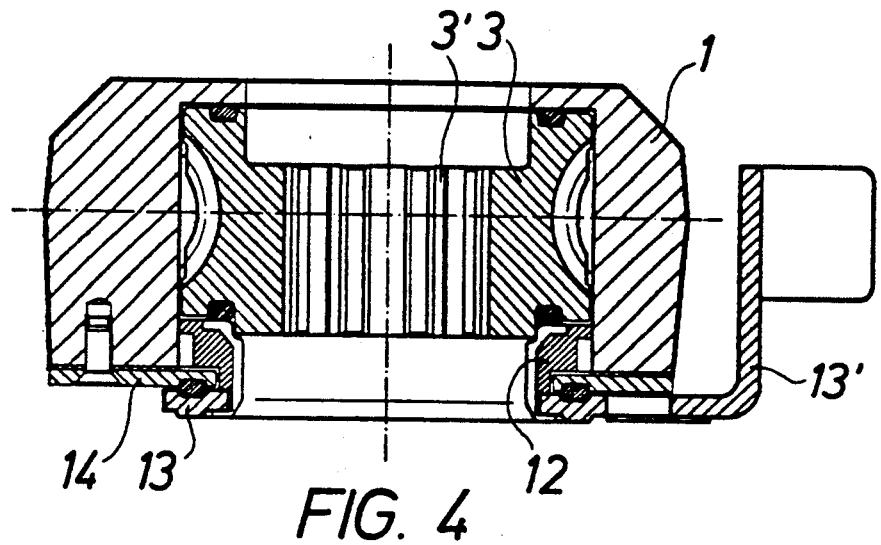
FIG. 4 is a view along the line IV—IV in FIG. 1

The end of the worm screw 4 to the right in FIG. 3 extends out of the housing 1, and the worm screw is here provided with a hexagonal tool grip 4' for manual rotation of the screw 4. At this end there is a cover 5 threaded into the housing 1 around the screw 4. A clutch wheel 6 is rotatable on the worm screw 4 and is journalled against the cover 5 by means of an axial bearing 7. Coacting, generally radial, toothed surfaces on the worm screw 4 and the clutch wheel 6 form a clutch 8.

The worm screw 4 is biassed to the right in FIG. 3—or in other words for engagement of the clutch 8—by a strong compression spring 9 arranged between a spring washer 10 at the end of the worm screw 4 and a spring cover 11 threaded into the housing 1.

A control unit 12-14 is arranged in the same bore in the housing 1 as the worm wheel 3, but is not connected thereto. It has a rotatable control disc 12, which has a toothed periphery and is connected to an external control ring 13 having a control arm 13' extending therefrom. A plane cover 14 is arranged between the control disc 12 and the control ring 13 and is screwed to the housing 1 for rotatable attachment of the control unit 12-14.

The control arm 13' is to be connected to a fixed part of the chassis of the vehicle on which the lever is rockably mounted. The purpose of the control unit 12-14 is to provide a reference or control signal for the brake lever, as will be explained below.

Figure 1:
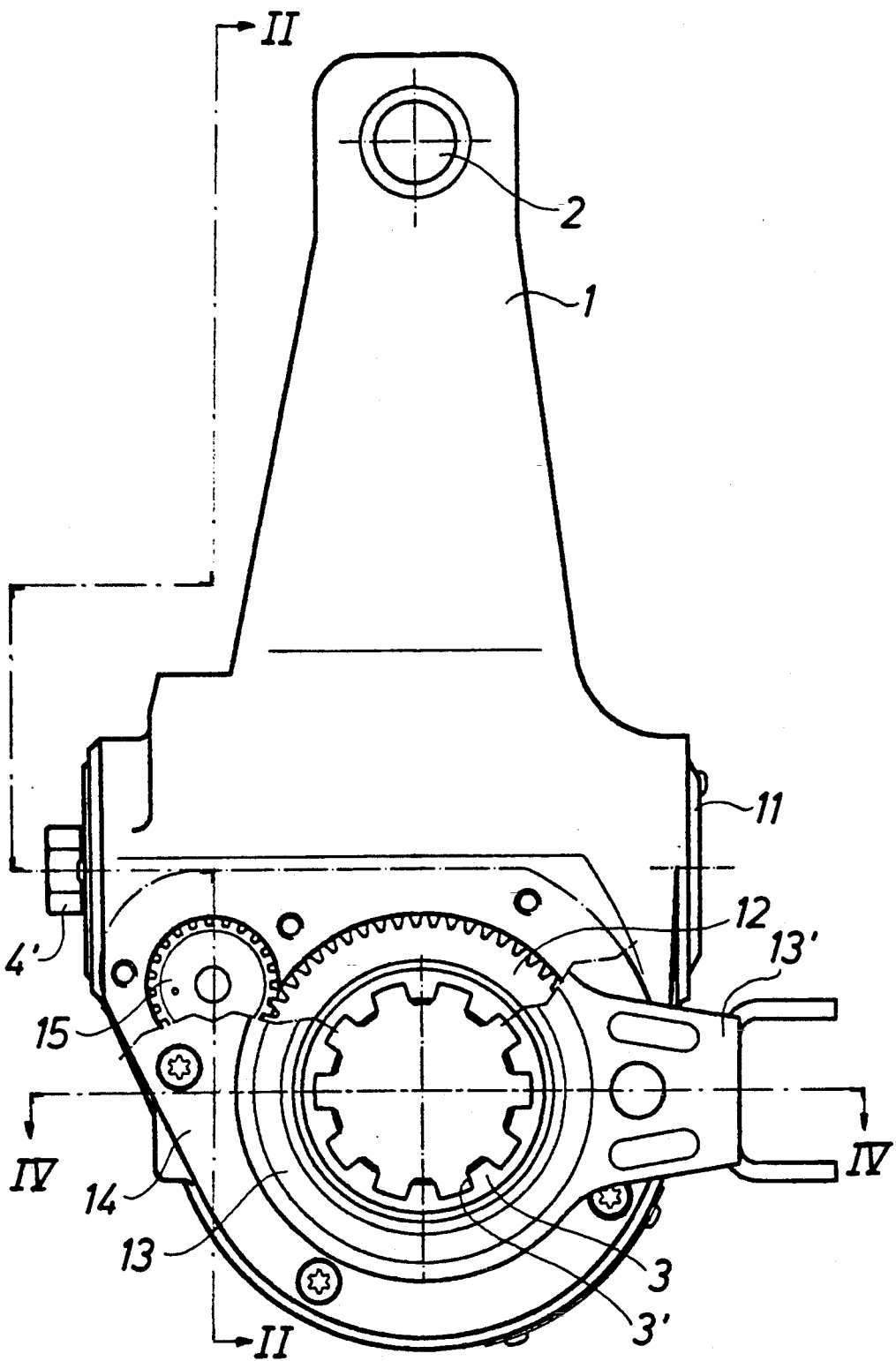
FIG. 1 is a side view of a brake lever according to the invention.
Figure 2:
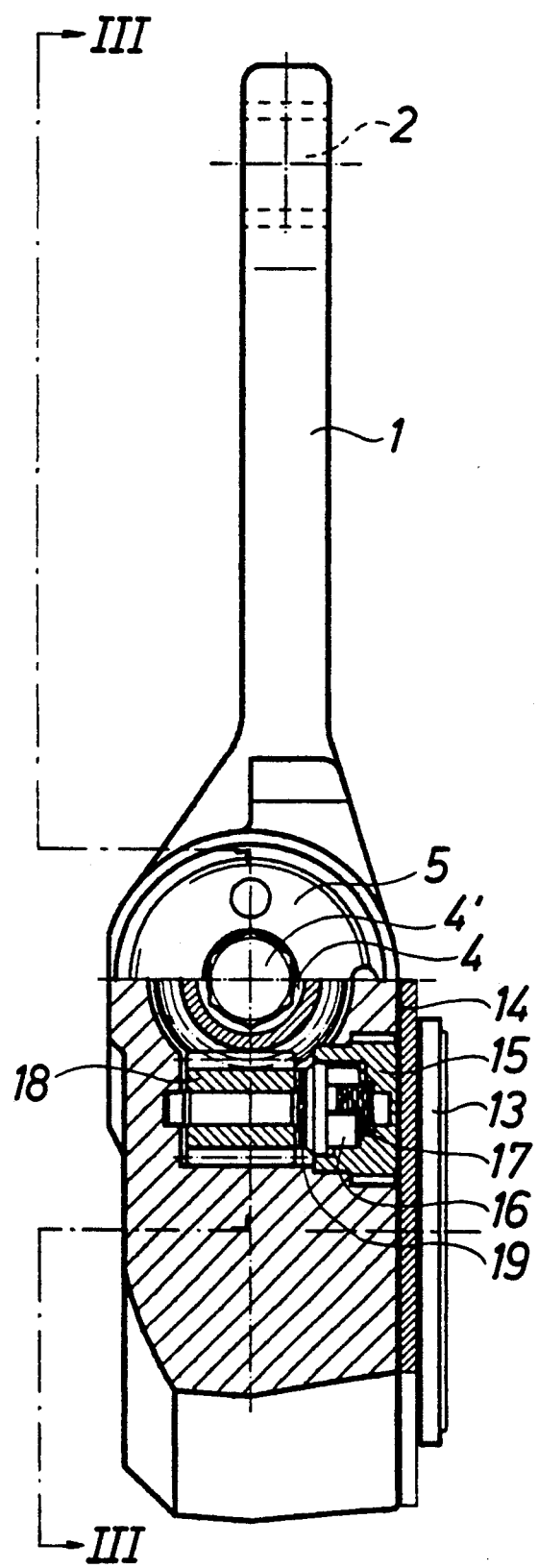
FIG. 2 is a view along the line II—II in FIG. 1.
Figure 5:
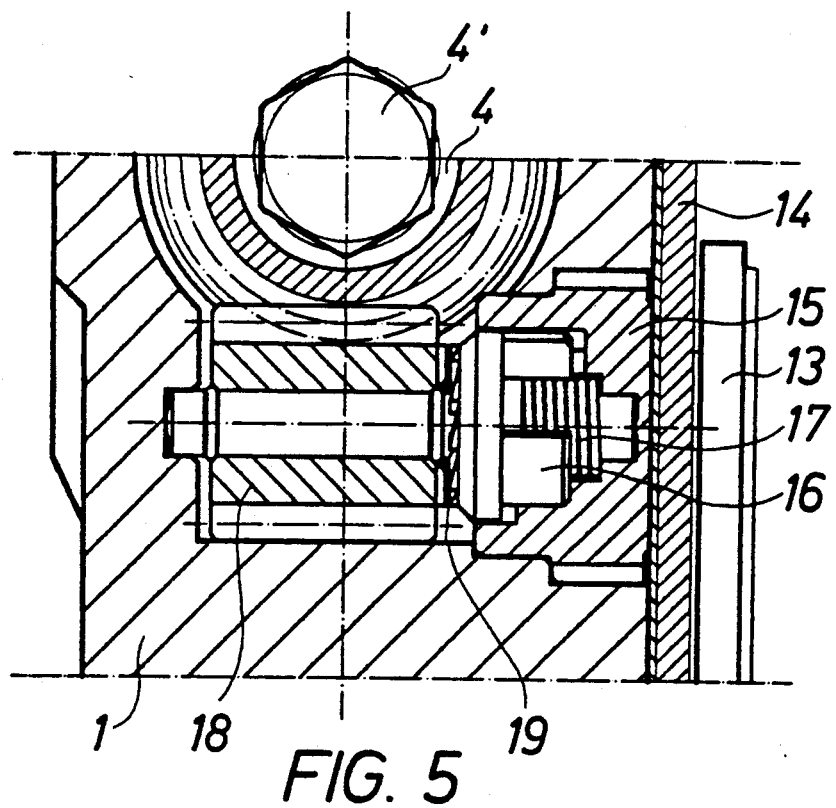
FIG. 5 is a part view from FIG. 2 to a larger scale.

Meshing with the toothed control disc 12 is a pinion 15, which is rotatable in the housing 1. This pinion 15 can be seen in FIGS. 1 and 2 but best in FIG. 5, to which further reference is made.

A carrier wheel 16 is arranged inside the pinion 15. It may be turned back and forth relative to the pinion only to a limited extent, corresponding to the desired slack between the brake shoes and the brake drum. The control distance or so called A-distance for the brake lever is accordingly defined between the pinion 15 and carrier wheel 16. These two parts are connected by means of a relatively weak torsion spring or return spring 17, which also has the function to keep a one-way clutch 19 (see below) engaged.

Coaxial with the pinion 15 and the carrier wheel 16 is a rotatable control screw 18 meshing with the clutch wheel 6 (FIG. 3). The carrier wheel 16 and the control screw 18 are connected by means of a toothed one-way clutch 19.

The purpose of a brake lever of the kind concerned is to transmit the brake force from the brake cylinder to the S-cam shaft of the brake but also—with the help of the described device in the brake lever—to adjust the slack between the brake drum and the brake shoes to a desired value.

The function of the brake lever with the built-in slack adjuster according to the invention will now be described. The slack is supposed to be excessive.

The starting point for this description is that during a preceding brake operation the torsion spring 17 is tensioned in the rotational direction due to the play between the pinion 15 and the carrier wheel 16, corresponding to the desired slack between the brake drum and the brake shoes. The torque of the spring 17 is not great enough to drive the carrier wheel 16, control screw 18, clutch wheel 6, worm screw 4 and worm wheel 3, when the clutch 8 is engaged. This is the case when the housing 1 moves rotationally about the worm wheel axis in the counter-clockwise direction in FIG. 1 an arc which corresponds to the application movement of the brake shoes before they have engaged the brake drum.

At the very first part of the brake application movement the pinion 15 rolls on the control disc 12 a rotational distance corresponding to the play between the pinion 15 and the carrier wheel 16.

At this movement the torque of the torsion spring 17 decreases.

When this rotational distance has been passed, which means that the actual slack between the brake shoes and the brake drums is greater than desired, the pinion 15 will start to carry the carrier wheel 16 with it, so that the one-way clutch 19 gets a new engagement.

In the next stage the brake shoes engages the brake drum, so that the counterforce increases and the worm screw 4 moves axially under compression of the compression spring 9, which means that the clutch 8 is disengaged.

The rotational resistance for the clutch wheel 6 is hereby greatly decreased, so that it can rotate without driving the worm screw 4 at the continued brake application.

During the first part of the brake release the pinion 15 rolls on the control disc 12 (in the direction opposite to that during brake application) and drives the carrier wheel 16, control screw 18 and clutch wheel 6 via the torsion spring 13. As the clutch 8 still is disengaged, the worm screw 4 is not driven.

When the brake shoes are about to leave their engagement with the brake drum and accordingly the force decreases, the compression spring 9 moves the worm screw 4 to the right, again engaging the clutch 8. Hereby the rotational resistance for the clutch wheel 6 increases to the extent that its rotation is stopped.

At the continued release movement of the housing 1 (in the clockwise direction in FIG. 1) the pinion 15 rolls on the control disc 12, but the torsion spring 17 cannot turn the carrier wheel 16 and the control screw 18 due to the rotational resistance of the clutch wheel 6. This means that the play between the carrier wheel 16 and the pinion 15 is consumed or in other words that the initial position between these two parts is reinstated, and that the torsion spring 17 is tensioned.

During the remaining and last part of the release stroke of the brake lever the pinion 15 rolls on the control disc 12 and drives the carrier wheel 16, control screw 18, clutch wheel 6, worm screw 4 and worm wheel 3, arranged on the S-cam, which is turned, so that the distance or slack between the brake shoes and the brake drum is decreased. As the decrease at each brake application is relatively minor, several applications may be needed, before the slack has been decreased to the desired value.

The above description of the function presupposes that the slack is excessive. If that is not the case, the brake application is virtually the same with the important difference that the one-way clutch 19 is not disengaged and reengaged in a new position. The description above of the release stroke is also valid with the exception that the movement stops when the play between the pinion 15 and the carrier wheel 16 has been consumed. Accordingly no adjustment occurs.

I claim:

1. A brake lever for attachment to a splined S-cam shaft of an automotive drum brake and connection to a brake cylinder push rod, including a worm wheel (3), rotatably mounted in a housing (1) of the brake lever and having internal splines (3') for cooperation with the S-cam shaft, and a worm screw (4), rotatable in the housing perpendicularly to the worm wheel and meshing therewith, and a control arrangement (13, 12, 15, 16, 18) for transmitting a control movement from a reference point (13') to a clutch wheel (6), which is rotatable on the worm screw (4), depending on the angular movement of the brake lever, and which forms a clutch (8) with the worm screw (4) normally held engaged by a strong compression spring (9), the control arrangement including a control disc (12), which is rotatable coaxially with the worm wheel (3) and is connected to a control ring (13) having a control arm (13') for establishing the reference point by being attached to a fixed part of a vehicle chassis, a pinion (15) meshing with the toothed periphery of the control disc (12), a carrier wheel (16) and a control screw (18), the latter two parts being coaxial with the pinion and the last mentioned part being in tooth engagement with the clutch wheel (6), wherein the axis of the worm screw (4) is perpendicular to the axis of the pinion (15), carrier wheel (16) and control screw (18), characterized in that the carrier wheel (16) can be turned or has a lost motion relative to the pinion (15) corresponding to a desired slack or control distance for the brake lever and is angularly biassed by a torsion spring (17) in a direction corresponding to brake application and in that a toothed one-way clutch (19) is formed between the carrier wheel (16) and the control screw (18).

2. A brake lever according to claim 1, characterized in the torsion spring (17) also acts as a compression spring for keeping the one-way clutch (19) engaged,

* * * * *